UNITED STATES PATENT OFFICE.

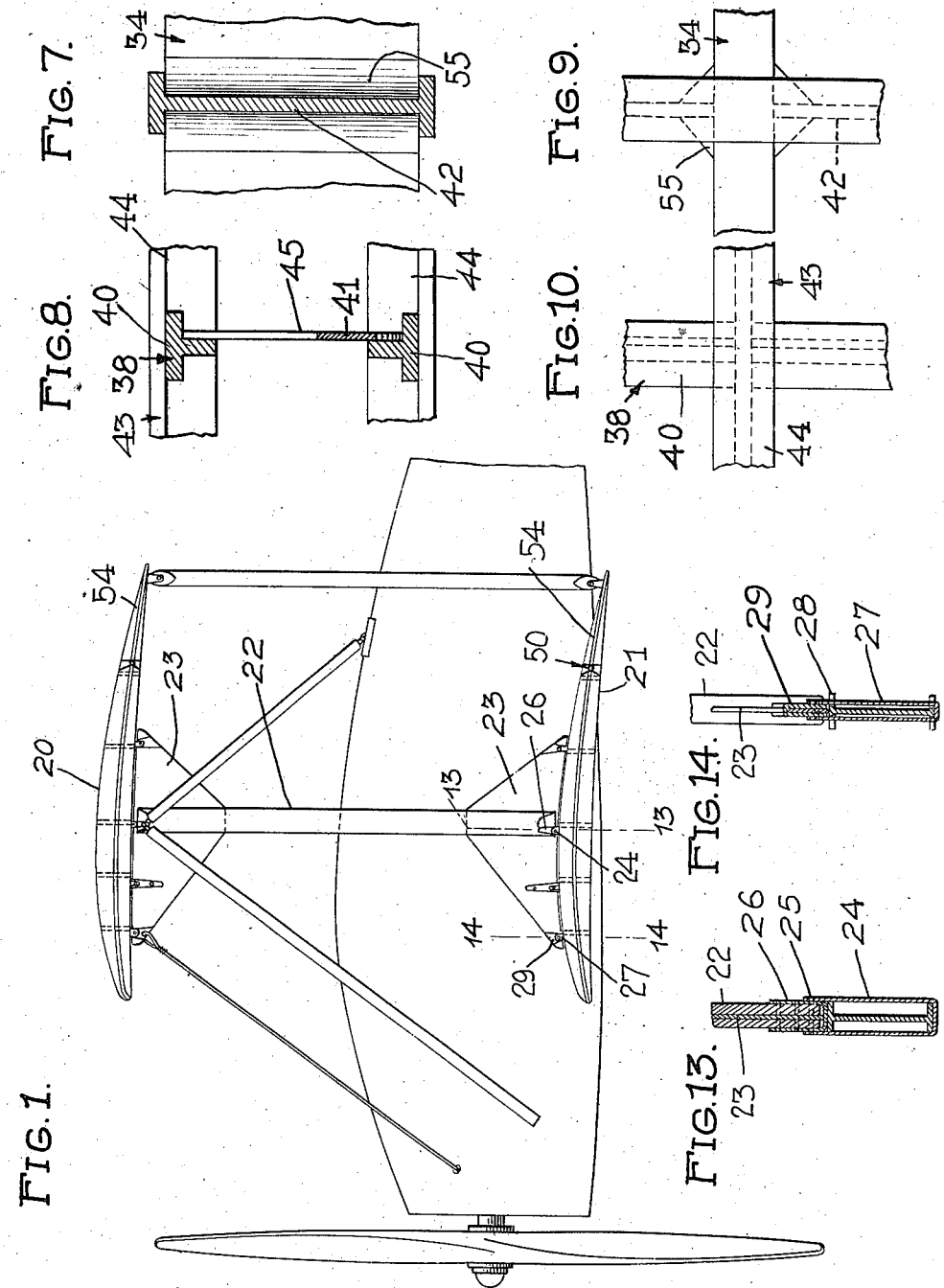

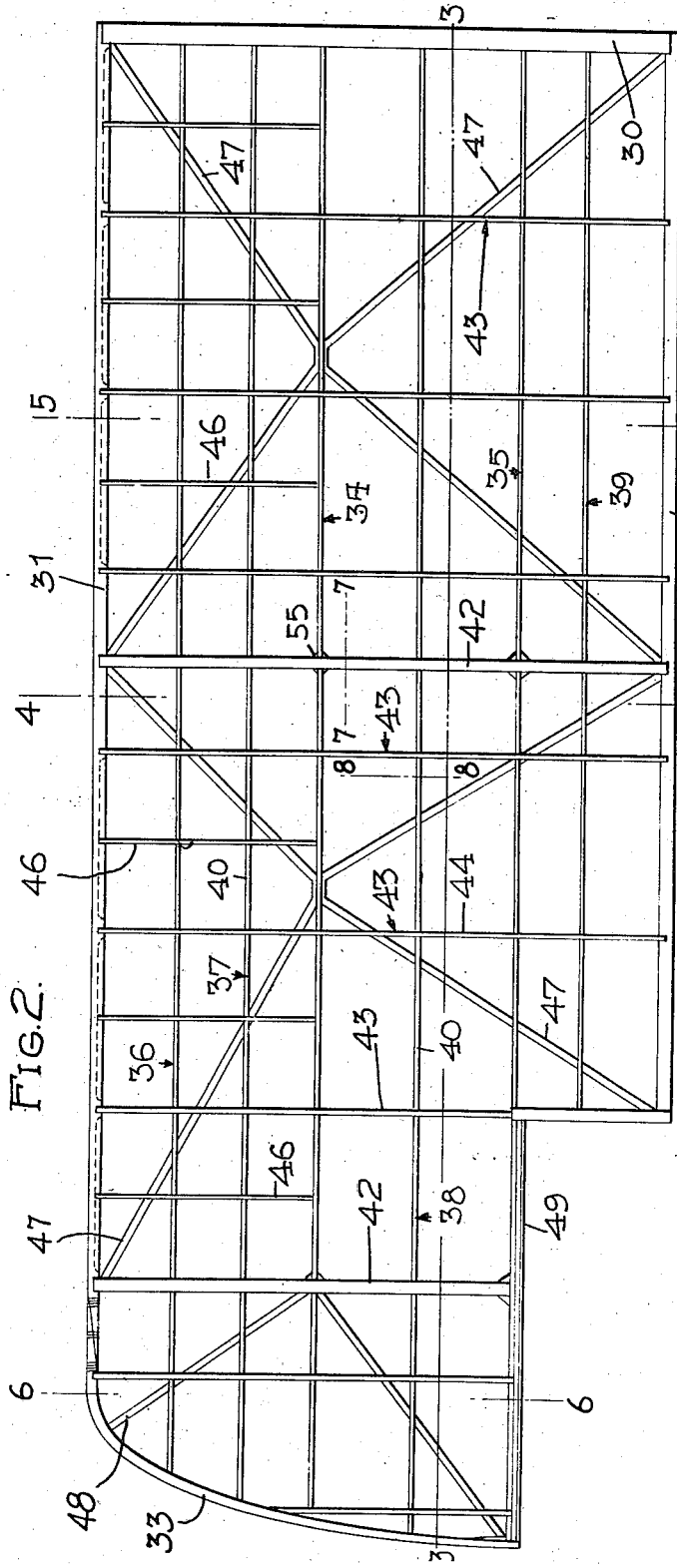
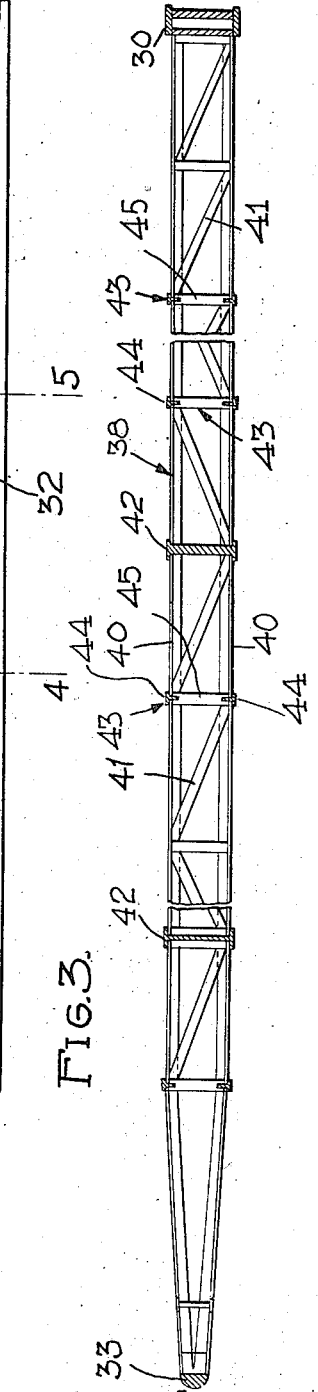

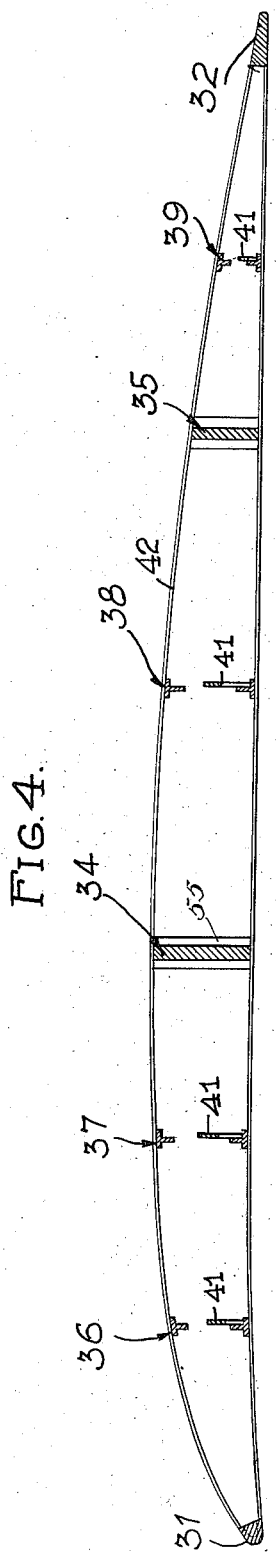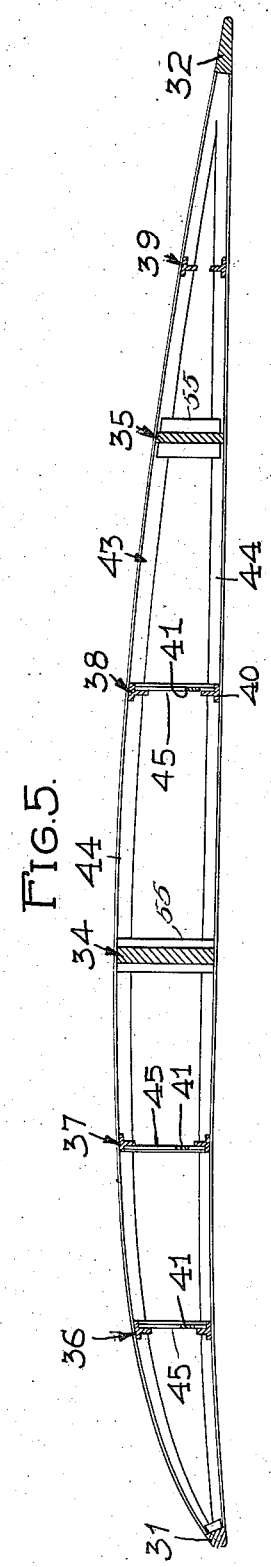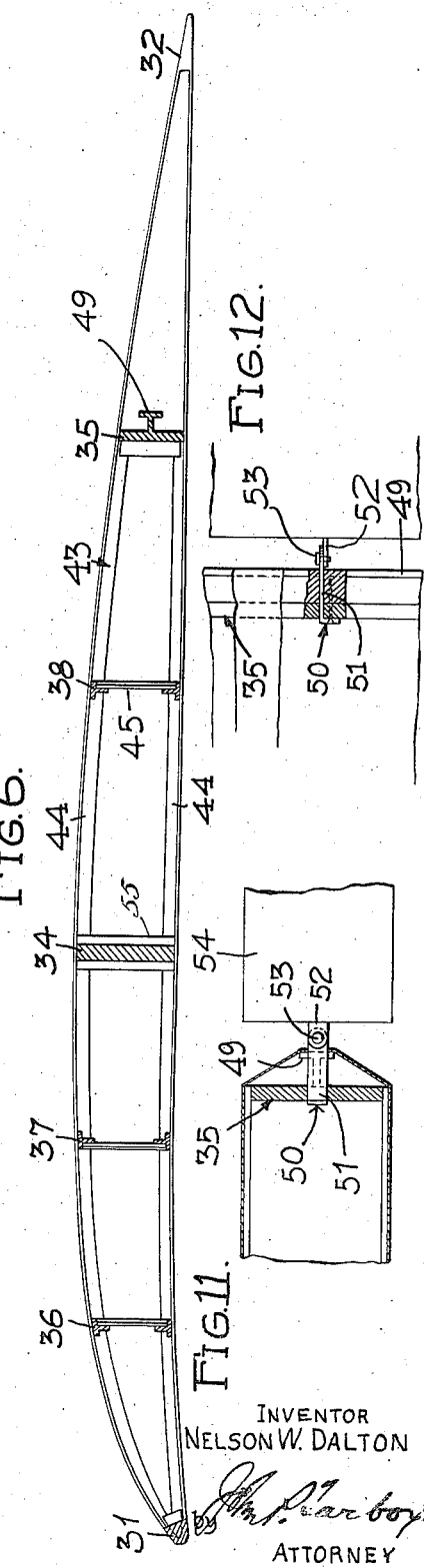

NELSON W. DALTON, OF GARDEN CITY, NEW YORK, ASSIGNOR TO CURTISS AEROPLANE AND MOTOR CORPORATION, A CORPORATION OF NEW YORK.

AIRPLANE-WING CONSTRUCTION.

1,310,942.　　　　Specification of Letters Patent.　　Patented July 22, 1919.

Application filed March 25, 1918. Serial No. 224,547.

*To all whom it may concern:*

Be it known that I, NELSON W. DALTON, a citizen of the United States, residing at Garden City, in the county of Nassau and State of New York, have invented certain new and useful Improvements in Airplane-Wing Construction, of which the following is a specification.

My invention relates to aerofoil construction and more particularly to improvements in wing or supporting surface construction as applied to airplanes generally.

In using the term "longitudinal" and "transverse" herein as descriptive of the structural elements of the wing, I refer to the elements which extend respectively longitudinally and transversely of the wing itself rather than the machine or airplane as a whole. The term "beam" as herein used is to be given a broad interpretation as it is intended to cover beams of the trussed or latticed type as well as solid beams, box beams and beams of other types.

The ordinary wing or supporting surface generally consists of two main longitudinal beams or spars, a series of transverse ribs, one or more extra heavy ribs or compression members and wiring. The main beams carry the compression or tension stress due to the lift wiring, the bending stress due to the lift load, and the tension or compression stress due to the internal wing wiring; the ribs collectively prevent twisting of the beams or spars and afford a foundation for the wing covering (usually fabric); the compression members carry the compression stress due to the internal drift and antidrift wiring and the compression stress due to the interplane wiring; and the wiring itself carries the tension due to lift, drift and landing. The compression members are usually provided at the strut points in the wing and at the ends of the compression members the internal wing wires are usually anchored. The "strut points" in the wing are the points at which the interplane struts or wing posts are fastened.

In the present invention, instead of providing but two main wing beams or spars a plurality of longitudinal beams (three or more) are provided. At least one of the total number of longitudinal beams is continuous and uninterrupted throughout the full length of the wing while one or more of the remaining number of the longitudinal beams are made up of two or more longitudinally alined beam sections. These beams may or may not be of the latticed or trussed type although in the preferred embodiment of the invention the sectional longitudinal beams are of the latticed type while the continuous longitudinal beams are solid.

In addition to the longitudinal beams a multiplicity of transverse beams or ribs are provided. Like the longitudinal beams, the transverse beams or ribs are preferably differently constructed. One or more of the transverse beams (preferably the beam or beams located at the strut point or points in the wing), while generally similar in construction to the continuous longitudinal beam or beams in that it is solid is apertured at one or more points throughout its length to let the continuous longitudinal beam pass uninterruptedly through it without a break in its (the longitudinal beam) continuity. At its point or points of intersection with the sectional longitudinal beam or beams the solid transverse rib is uninterrupted or continuous. At such points the ends of the beam sections abut the transverse beam upon its opposite faces. In other words, there are one or more continuous longitudinal beams and one or more continuous transverse beams, the transverse beam or beams being deeper than the longitudinal beams and apertured to allow the longitudinal beams to extend uninterruptedly through it or them. The transverse beams constructed as above set forth distribute the compression or tension stress set up in the wing over all of the longitudinal beams. The sectional longitudinal beams and the continuous longitudinal beams together carry the bending stress due to the air lift load, and as the sectional longitudinal beams abut and are fastened to the transverse beam or beams above mentioned it is obvious that the bending stress is carried to the strut points in the wing. The compression stress due to the interplane wiring, if the wing is used in connection with a biplane or multiplane, like the bending stress, is carried by all of the longitudinal beams, and as the vast majority of the longitudinal beams are interrupted at the transverse beam or beams, obviously a fracture or mutilation of one of the sectional longitudinal beams (or even one of the continuous longitudinal beams) will only tend to weaken the wing without causing it to collapse. In other words, the continuous transverse ribs provide a distributing agent whereby the stresses, both tension and compression, are distributed over all of the longitudinal beams.

The advantages of a wing thus characterized in addition to the better distribution of stresses above pointed out are as follows: it is cheaper due to the fact that all of the parts can be machined; it is lighter due to the fact that a larger percentage of the structural elements of the wing are constructed in latticed or trussed form rather than solid as heretofore; and it is safe due to the fact that one of its longitudinal beams may be shot away or otherwise fractured without completely destroying the factor of safety originally accorded the wing. Because of the latter it is particularly well suited to military use.

Of the drawings wherein like characters of reference designate like or corresponding parts:—

Figure 1 is a side elevation of an airplane equipped with supporting surfaces of the type disclosed showing the manner in which the surfaces are interconnected.

Fig. 2 is a plan view of the improved airplane wing structure (the fabric covering having been removed).

Fig. 3 is an enlarged longitudinal sectional view of the wing.

Fig. 4 is an enlarged transverse section on the line 4—4 of Fig. 2.

Fig. 5 is a similar view on the line 5—5 of Fig. 2.

Fig. 6 is yet another and similar section on the line 6—6 of Fig. 2.

Fig. 7 is a fragmentary sectional view on the line 7—7 of Fig. 2.

Fig. 8 is a similar view on the line 8—8 of Fig. 2.

Figs. 9 and 10 are detail top plan views of the fragments shown in Figs. 7 and 8 respectively.

Fig. 11 is a detail view of the aileron hinge connection.

Fig. 12 is a view at right angles to Fig. 11, and

Figs. 13 and 14 are enlarged sections on the lines 13—13 and 14—14 of Fig. 1.

The wing herein disclosed may be used in connection with machines of different types. It is designed to carry tension as well as compression stress. If used on a biplane as one of the wings of the upper supporting surface it will, under normal flight conditions, be subjected to compression stress. If used as one of the wings of the lower supporting surface of a biplane it will, under normal conditions, be subjected to tension stress. It will be described, however, as an upper wing of a biplane or multiplane, and it should for this reason be understood that its particular location or use is immaterial.

By way of example I have illustrated in Fig. 1 of the drawings a machine in side elevation. This machine is of the biplane type and is provided with superposed supporting surfaces or wings designated respectively 20 and 21. These surfaces are interconnected by wing posts or struts 22 (but the outer end strut being shown) which are widened at their extremities as at 23 to overlap and extend beyond a number of the longitudinal members of each wing whereby they are effectually braced longitudinally as respects the machine and transversely as respects the wing. Appropriate fittings detailed in Figs. 13 and 14 are provided for fastening the struts 22 to the wings. Although generally similar these fittings are of different detail construction. The fitting illustrated in Fig. 13 is mounted at the foot of the strut (the same type of fitting as mounted at the top) and comprises a metal strap 24 of substantially U-shape and of a size such that it snugly embraces one of the transverse members of the wing 21. The legs or extensions of this strap extend without the confines of the wing to engage with the opposite faces of the strut where they are pinned or securely fastened by other suitable means as at 25. The widened strut end 23, i. e., nothing more or less than a gusset plate, is protected and strengthened at the point of attachment of the strap 24 by a similarly bent but somewhat smaller U-shaped metal cap 26 riveted in place.

The fitting detailed in Fig. 14 comprises a U-shaped strap 27 having a shortened bight portion. The transverse member of the wing at the point of engagement of this fitting is notched as at 28 to accommodate the strap. In other respects it is very much the same as the fitting of Fig. 13 except that the cap, designated 29 is inverted and embraces the gusset plate from the top rather than from the bottom.

The wing *per se* comprises a box beam 30, a leading edge strip 31, a trailing strip 32 and an outer end strip 33. Solid wing beams 34 and 35 and latticed wing beams or trusses 36, 37, 38 and 39 extend longitudinally of the wing, preferably in parallelism. The latticed wing beams or trusses 36 and 37 are located intermediate the leading edge strip 31 and the solid front beam 34, the latticed beam or truss 38 intermediate the solid beam 34 and the solid wing beam 35, and the latticed beam or truss 39 intermediate the solid beam 35 and the trailing edge strip 32. Each latticed beam is of a similar construction although of a different depth according to location. They (the latticed beams or trusses) comprise substantially T-shaped chords 40 and diagonals 41. The T-shaped chords oppose one another and the diagonals 41 interconnect them. At the outer end or tip of the wing the longitudinal latticed beams narrow hence the chords 40 converge.

The beams 34 and 35 are solid throughout and preferably of a uniform thickness. This thickness is substantially equal to the thickness or rather width of the chords of the latticed longitudinal beams and in plan makes all of the longitudinal beams (both solid and latticed) appear to be of an identical construction. The placement of the solid longitudinal beams is such that the front beams of the superposed wings aline with the struts 22 which interconnect them. The rear wing beams 35 are distantly removed from the strut points and are smaller and lighter in view of the rearwardly decreasing thickness of the wings.

At the strut point or points in the wing extra heavy ribs or transverse beams are provided. These ribs or transverse beams (see Fig. 7) are preferably of I form in cross section and constitute a means whereby the latticed longitudinal beams 36, 37, 38 and 39 as well as the solid longitudinal beams 34 and 35 are placed under compression due to the interplane wiring (not shown) and since the ribs 42 are located at the strut points in the wing it is necessary that they be made extra heavy. By making them extra heavy an adequate distributing agent for the compression stresses set up in the wing is provided. It is these beams 42 which are relied upon to distribute the compression stresses over all of the longitudinal beams both latticed and solid more or less uniformly. Should one of the longitudinal beams be fractured or shattered the remaining number thereof will, due to this distribution, carry the entire load although the factor of safety will of course be somewhat reduced.

Intermediately of the two solid transverse ribs or beams 42 a number of transverse beams or trusses 43 are provided. These transverse latticed beams or trusses are patterned somewhat after the construction of the longitudinally latticed beams or trusses in that they comprise longitudinally extending T-shaped chords 44 and interconnecting strips 45. The latter however, extend vertically rather than diagonal and are provided at the points of intersection of the longitudinal trusses with the transverse trusses or latticed beams. This construction is extremely light and cheap yet of sufficient strength to prevent twisting and distortion of all of the longitudinal beams. As the heads of the T-shaped chords constituting the transverse latticed beams are relatively close together it is evident that they will provide a suitable foundation for the fabric covering (not shown) of the wing.

Additional wing bracing in the form of stiffeners 46 and braces 47 and 48 is provided. The stiffeners 46 parallel the transverse beam and interconnect preferably the leading edge strip 31 and the front solid longitudinal beam 34 intersecting of course, the intermediately located longitudinal latticed beams 36 and 37. The braces 47 extend diagonally inwardly from the four corners of the wing bays as defined by adjacent solid transverse beams. They also stiffen the wing longitudinally. The braces 48 diverge from the point of intersection of the outer transverse beam 42 with the front solid longitudinal beam 34 to points at or near the terminals of the outer end wing strip 33.

As a further means for lightening the wing and yet permitting of free movement of the ailerons (where ailerons are provided) the rear solid beam 35 is equipped with a trailing strip 49 of substantially T-shape in cross section. This strip lies contiguous to the beam 35 throughout the aileron jog length and is held in place by the fabric covering (see Fig. 11) which embraces it. It is accordingly inclosed within the confines of the wing so that when the wing is completed it is removed from the line of air rush. Throughout its length, preferably at or near its ends, the strip 49 is provided with aileron hinges 50 which comprise connected hinge plates 51 and 52. The hinge plate 51 is substantially L-shaped with its hook end let through the rear beam 35 and its extension carried beyond the trailing edge of the strip. The hinge plate 52 is pinned as at 53 to the plate 51 and carried into the aileron 54 in a suitable manner affording the desired strength.

For added strength at the points of intersection of the solid transverse beams with the longitudinal latticed beams or trusses and the solid longitudinal beams, corner blocks 55 are provided. This blocking stiffens the intersecting beams vertically and strengthens the wing structure at these points. In Fig. 2 of the drawings wherein this blocking is disclosed, only that portion of a supporting surface constituting one of its wings is shown. If desired the wings may be separately constructed or the opposed wings constructed as a unit. In the latter event the box beam 30, which will fall in the longitudinal vertical plane of the fore and aft axes of the craft should be widened for added strength.

The solid longitudinal wing beams 34 and 35 are continuous throughout their full length while the latticed longitudinal beams 36, 37, 38 and 39 comprise longitudinally alined beam sections which are arranged to abut the solid transverse beams 42. The transverse beams 42 (see Figs. 4 to 6 inclusive) are deeper than the continuous longitudinal beams and are apertured to let the continuous longitudinal beams pass uninterruptedly through them.

It will be noted, therefore, that both the extra heavy transverse ribs or beams 42 and the longitudinal beams 34 and 35 are continuous respectively throughout the full width and full length of the wing. The transverse beams, however, are apertured or rather have their webs apertured that the continuity of the longitudinal beams may be as stated. Being solid, the transverse beams 42 are thus made capable of effectually distributing the stresses over the several longitudinal latticed beams and the solid longitudinal beams as well. Furthermore, the diagonal braces are commonly fastened to the solid front beam 34 to longitudinally strengthen it. They terminate at the extremities of the solid transverse beams to similarly strengthen them.

A wing of the foregoing type is especially adapted to airplanes of the scout or high speed type. Its lightness and reduced production cost recommend it highly to the manufacturer, while the factor of safety derived through the use of the multiplicity of longitudinal beams makes it desirable for military use. The novel manner in which the stresses are distributed over and throughout the wing area and its radical departure from the conventional practice, as previously outlined, should be noted.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. An airplane wing including a longitudinal beam continuous throughout the full length of the wing, a transverse beam continuous throughout the full width of the wing, said transverse beam being apertured to let the longitudinal beam pass through it, and a plurality of divided longitudinal beams having adjacent beam sections abutting the opposite faces of the transverse beams, the arrangement being such that the stresses due to the air lift load and interplane wiring are distributed by means of the transverse beam over all of the longitudinal beams.

2. An airplane wing including a solid longitudinal beam continuous throughout the full length of the wing, a solid transverse beam continuous throughout the full width of the wing, said transverse beam being apertured to let the longitudinal beam pass through it, and a plurality of latticed longitudinal beams divided into beam sections, the arrangement of the beam sections being such that adjacent sections abut opposite faces of the transverse beam.

3. An airplane wing including a longitudinal beam continuous throughout the full length of the wing, a transverse beam continuous throughout the full width of the wing, said transverse beam being apertured to let the longitudinal beam pass through it, a plurality of longitudinal beams divided into beam sections, the arrangement of the beam sections being such that adjacent sections abut opposite faces of the transverse beam, and a plurality of transverse beams arranged to intersect all of the longitudinal beams, the relative arrangement of the beams being such that the continuous transverse beam effectually distributes the stresses set up in the wing due to the interplane wiring substantially uniformly over all of the longitudinal beams.

4. In an airplane, the combination with a wing and a wing post attached thereto, of a longitudinal beam incorporated in the wing, said beam being continuous throughout the full length of the wing, a transverse beam continues throughout the full width of the wing, said transverse beam being located at the strut point in the wing and provided with an aperture to let the longitudinal beam pass through it, and a plurality of longitudinal beams comprising alined beam sections, the ends of the beam sections abutting the opposite faces of the transverse beam, said transverse beam being of sufficient size and strength to act as a distributing agent, whereby the stresses set up in the wing due to the air lift load and interplane wiring are substantially uniformly distributed over all of the longitudinal beams.

5. An airplane wing including a solid continuous longitudinal beam, a divided latticed longitudinal beam, a solid continuous transverse beam, and a plurality of latticed transverse beams, the solid transverse beams being apertured to let the solid longitudinal beam pass through them and the arrangement of the latticed beam sections being such that adjacent beam sections abut opposite faces of a solid transverse beam.

6. In an airplane, the combination with a wing strut, of a biplane or multiplane wing structure, said structure including a plurality of longitudinal wing beams, one or more of said longitudinal wing beams being continuous throughout the wing length, a transverse wing beam located at the strut point of the wing, said transverse beam being apertured to allow the longitudinal beam or beams to pass through it, and means reinforcing the transverse beam at a point along its length, said means being so related to the transverse beam that it (the transverse beam) acts as a distributing agent for the stresses set up in the wing due to the interplane wiring, the stresses being accordingly distributed by the transverse beam substantially uniformly over all of the longitudinal beams.

7. A wireless airplane wing including a plural number of longitudinally extending wing beams, one of the total number of wing beams being continuous throughout the full length of the wing and two or more of the total number of longitudinal wing beams being made up of alined wing beam sections, a plurality of transverse wing beams, one or more of the transverse beams being heavier than the remaining number and continuous throughout the full width if the wing, said extra heavy transverse beams being apertured to allow the continuous longitudinal beams to pass through them, the arrangement of the extra heavy transverse beams with respect to the sectional longitudinal beams being such that adjacent alined beam sections abut opposite faces of the transverse beams, braces diagonally arranged between adjacent extra heavy transverse beams, the points of intersection of the respective braces being in the plane of one of the longitudinal continuous beams of the wing, the whole arrangement of the various beams being such that the extra heavy transverse beams substantially uniformly distribute the stresses set up in the wing over all of the longitudinal beams.

In testimony whereof I hereunto affix my signature.

NELSON W. DALTON.